United States Patent
Asada

(10) Patent No.: US 7,285,937 B2
(45) Date of Patent: Oct. 23, 2007

(54) ELECTRIC GENERATION CONTROL APPARATUS FOR VEHICLE ALTERNATOR

(75) Inventor: Tadatoshi Asada, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/785,208

(22) Filed: Apr. 16, 2007

(65) Prior Publication Data

US 2007/0188152 A1    Aug. 16, 2007

Related U.S. Application Data

(62) Division of application No. 11/485,344, filed on Jul. 13, 2006.

(51) Int. Cl.
*H20H 7/06* (2006.01)

(52) U.S. Cl. .............................. 322/24; 322/44; 322/7; 322/26; 322/27; 322/16; 322/90

(58) Field of Classification Search .................. 322/24, 322/44, 7, 27, 16, 26, 90
See application file for complete search history.

(56) References Cited

U.S. PATENT DOCUMENTS

| 5,629,606 A | 5/1997 | Asada |
| 5,767,636 A | 6/1998 | Kanazawa et al. |
| 6,707,169 B2 * | 3/2004 | Shimizu et al. .......... 290/40 C |
| 7,098,551 B2 * | 8/2006 | Wobben ....................... 290/44 |
| 7,176,658 B2 * | 2/2007 | Quazi et al. .................. 322/24 |

FOREIGN PATENT DOCUMENTS

| JP | B2-3505882 | 12/2003 |
| JP | B2-3531771 | 3/2004 |

* cited by examiner

*Primary Examiner*—Darren Schuberg
*Assistant Examiner*—Iraj A. Mohandesi
(74) *Attorney, Agent, or Firm*—Oliff & Berridge, PLC.

(57) ABSTRACT

An electric generation control apparatus for a vehicle alternator receives an electric generation control signal transferred from an ECU placed apart from the control apparatus through a data transfer line. The control apparatus has a voltage comparator, a communication state judgment circuit, a serial data communication receiver, a PWM communication receiver, and an electric generation control circuit. The voltage comparator acts as a receiver of receiving the electric generation control signal transferred through the data transfer line. The communication state judgment circuit judges whether the received signal is a PWM signal or a serial data signal. The serial data communication receiver and the PWM communication receiver demodulate an electric generation control parameter from the received control signal based on the judgment result. The electric generation control circuit controls the operation of the vehicle alternator based on the electric generation control parameter demodulated.

2 Claims, 7 Drawing Sheets

A DATA FRAME TRANSFERRED FROM ECU 500 TO ELECTRIC GENERATION CONTROL APPARATUS 100 IN SERIAL DATA COMMUNICATION

PWM COMMUNICATION PERFORMED BY PWM COMMUNICATION RECEIVER 21

A DATA FRAME TRANSMITTED FROM ELECTRIC GENERATION CONTROL APPARATUS 100 TO ECU 500 IN SERIAL DATA COMMUNICATION

TRANSMISSION OF ELECTRIC GENERATION STATE IN PWM COMMUNICATION

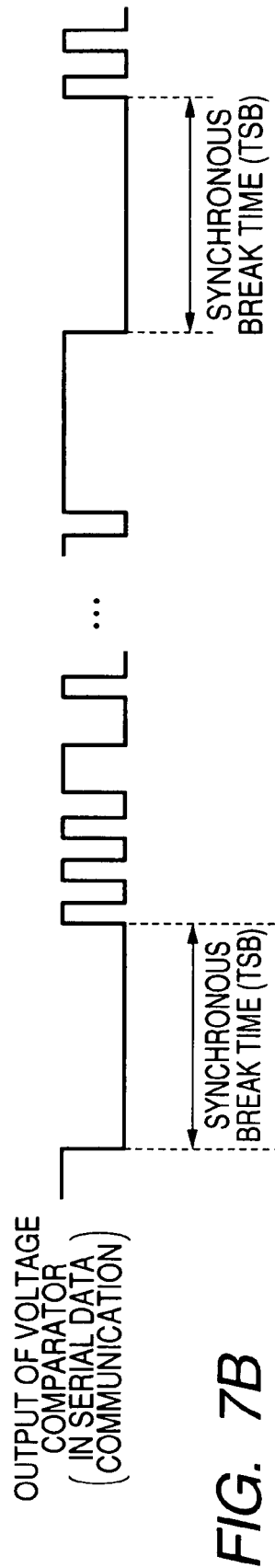
FIG. 7A  OUTPUT OF VOLTAGE COMPARATOR (IN SERIAL DATA COMMUNICATION)
FIG. 7B  OUTPUT OF FILTER (IN SERIAL DATA COMMUNICATION)
FIG. 7C  OUTPUT OF VOLTAGE COMPARATOR (IN PWM COMMUNICATION)
FIG. 7D  OUTPUT OF FILTER (IN PWM COMMUNICATION)

ELECTRIC GENERATION CONTROL APPARATUS FOR VEHICLE ALTERNATOR

CROSS-REFERENCE TO RELATED APPLICATIONS

This application is related to and claims priority from Japanese Patent Application No. 2005-225447 filed on Aug. 3, 2005, the contents of which are hereby incorporated by reference.

BACKGROUND OF THE INVENTION

1. Field of the Invention

The present invention generally relates to an electric generation control apparatus for a vehicle alternator, capable of controlling output of the vehicle alternator based on an electric generation control signal transferred from an external control device such as an electronic control unit (ECU), and capable of detecting and diagnosing electric generation state of a vehicle alternator and of transferring the diagnosis result to the ECU.

2. Description of the Related Art

There are well-known various types of electric generation control apparatus for electric generators such as vehicle alternators. One of them is capable of keeping a generation voltage at a constant voltage (for example, 14.5 Volts) that is higher than a battery open voltage (for example, 12.8 Volts) in order to perform a rapid battery charging, and capable of changing a control voltage according to the driving condition of a vehicle based on power generation control parameters transferred from the external control device such as an electronic control unit (ECU) mounted on the vehicle.

For example, the following two patent documents (1) and (2) have been known, that have disclosed LIN (Local Interconnect Network) protocol as one of serial data communication protocols.

(1) U.S. Pat. No. 5,767,636 (corresponding to the Japanese patent publication No. JP 3,505,882, pages 5 to 12, and FIGS. 1 to 31); and (2) U.S. Pat. No. 5,629,606 (corresponding to the Japanese patent publication No. JP 3,531,771, pages 5 to 11, and FIGS. 1 to 10).

However, the technique disclosed by the patent document (1) involves a following drawback. Because a vehicle alternator is directly mounted on a vehicle, when the ignition for a vehicle engine generates noises, the ignition noises are always on a communication bus and overlapped to control signals transferred between the power generation control apparatus and the ECU through the communication bus. In General, the ignition noises are changed according to vehicle condition and vehicle engine condition because an optimum ignition voltage is changed according to the magnitude of engine load. Accordingly, such an ignition noise causes signal-wave fluctuation and thereby causes checksum error or parity error. The occurrence of such an error obstructs the normal communication between the power generation control apparatus and the ECU, and reduces the capability to monitor the power generation state of the vehicle alternator by the external control apparatus and to control the power generation by the vehicle alternator.

SUMMARY OF THE INVENTION

It is an object of the present invention to provide an electric generation control apparatus to be applied to a vehicle alternator, capable of keeping at least a basic communication capability satisfying basic requirement in data communication, capable of informing electric generation state of the vehicle alternator, and capable of controlling the electric generation of the vehicle alternator even if various kinds of noises are on or overlapped to a communication transmission line.

To achieve the above purposes, the present invention provides an electric generation control apparatus that receives an electric generation control signal transferred from an external control device located apart from the electric generation control apparatus through a data transmission line. The electric generation control apparatus controls electric generation state of a vehicle alternator based on the received electric generation control signal. The electric generation control apparatus has a receiver, a judgment circuit, a demodulation circuit, and an electric generation control circuit. The receiver is configured to receive an electric generation control signal transferred from the external control device through the data transmission line. The judgment circuit is configured to judge whether the electric generation control signal received by the receiver is a serial data signal or a pulse width modulation (PWM) signal. The demodulation circuit is configured to demodulate the electric generation control signal to an electric generation control parameter according to the judgment result of the judgment circuit. The electric generation control circuit is configured to control the electric generation state of the vehicle alternator based on the electric generation control parameter demodulated by the demodulation circuit. Because the electric generation control apparatus has the above configuration, it is possible to receive the electric generation control signal by using either the serial data signal having a large data transmission capability or the PWM signal having a large anti-noise capability even if noises are on or overlapped to the data transmission line. Thus, the electric generation control apparatus is capable of performing the electric generation control for the vehicle alternator while keeping at least a basic communication capability satisfying basic requirement in data communication to the external control device.

Further, according to the present invention, it is preferred that the serial data signal includes a synchronous break signal indicating the initiation of a data transmission of the serial data signal. The synchronous break signal is one of a fixed low level and a fixed high level of a specified time length. It is further preferred that the judgment circuit judges that the electric generation control signal is the serial data signal when the time length of the level of the received electric generation control signal is shorter than the specified time length, and judges that the electric generation control signal is the PWM signal when the time length of the level of the received electric generation control signal is longer than the specified time length. It is thereby possible to certainly judge the type of the received signal, for example, the serial data signal or the PWM signal, by checking the time length of the continuously fixed voltage level of the received signal and whether or not it is longer than the specified time length that is the allowable maximum time length for the serial data signal.

Still further, according to the present invention, it is preferred that the demodulation circuit has a filter of a filter constant that is longer than the fixed time length of the synchronous break signal, and a PWM demodulation circuit is configured to demodulate the PWM signal output of the filter that receives the electric generation control signal. Because the electric generation control apparatus has the above configuration, it is possible to select the filter of an optimum filter constant having an adequate margin against noises, and it is thereby possible to prevent occurrence of bit error, namely, occurrence of the change of the contents of a received signal by noises, and to perform the PWM communication to demodulate the PWM signal certainly, even if the serial data communication can not be performed.

Moreover, according to the present invention, it is preferred that the data including the electric generation control parameters are transferred by the serial data communication when it is able to perform the serial data communication, and the data are transferred by the PWM communication when the serial data communication can not be performed.

It is thereby possible to switch the serial data communication with the PWM communication easily on detecting the difficulty to perform the serial data communication, for example, when it is difficult to perform scheduled electric generation control to the vehicle alternator based on the serial data communication, when the detected signal level on the data transmission line indicates the difficulty to continue the serial data communication, and when there is no response to the electric generation control parameters transferred from the external control device. Still further, according to the present invention, an electric generation control apparatus for a vehicle alternator has an electric generation state transmitter, a communication state judgment circuit, and a diagnosis information setting circuit. The electric generation state transmitter is configured to generate a serial data signal including an electric generation state signal indicating a state of the vehicle alternator, and to transfer the serial data signal through a data transmission line to an external control device located apart from the electric generation control apparatus. The communication state judgment circuit is configured to judge a communication state through the data transmission line. The diagnosis information setting circuit is configured to instruct to the electric generation state transmitter so that the voltage of the data transmission line is fixed to a specified level in order to inform occurrence of abnormal state of the electric generation of the vehicle alternator to the external control device when the communication state judgment circuit judges difficulty of serial data transmission using the serial data signal.

It is thereby possible to inform to the external control device at least minimum information regarding the abnormal state of the electric generation of the vehicle alternator even if it is unable to perform the serial data communication by noises on the data transmission line.

Still further, according to the present invention, it is preferred to judge the difficulty to perform the serial data communication when the abnormal state of the serial data communication is continued for a specified time length or when the number of the abnormal states of the electric generation of the vehicle alternator exceeds a specified number.

It is thereby possible to detect the difficulty to perform or continue the serial data communication certainly, and on the contrary, possible to continue the serial data communication even if accidental or occasional interruption of the serial data communication happens.

BRIEF DESCRIPTION OF THE DRAWINGS

A preferred, non-limiting embodiment of the present invention will be described by way of example with reference to the accompanying drawings, in which:

FIG. 7A shows an output signal of a voltage comparator in the serial data communication;

FIG. 7B shows an output signal of a filter in the serial data communication;

FIG. 7C shows an output signal of the voltage comparator in the PWM communication;

FIG. 7D shows an output signal of the filter in the PWM communication;

DETAILED DESCRIPTION OF THE PREFERRED EMBODIMENTS

Figure 1:
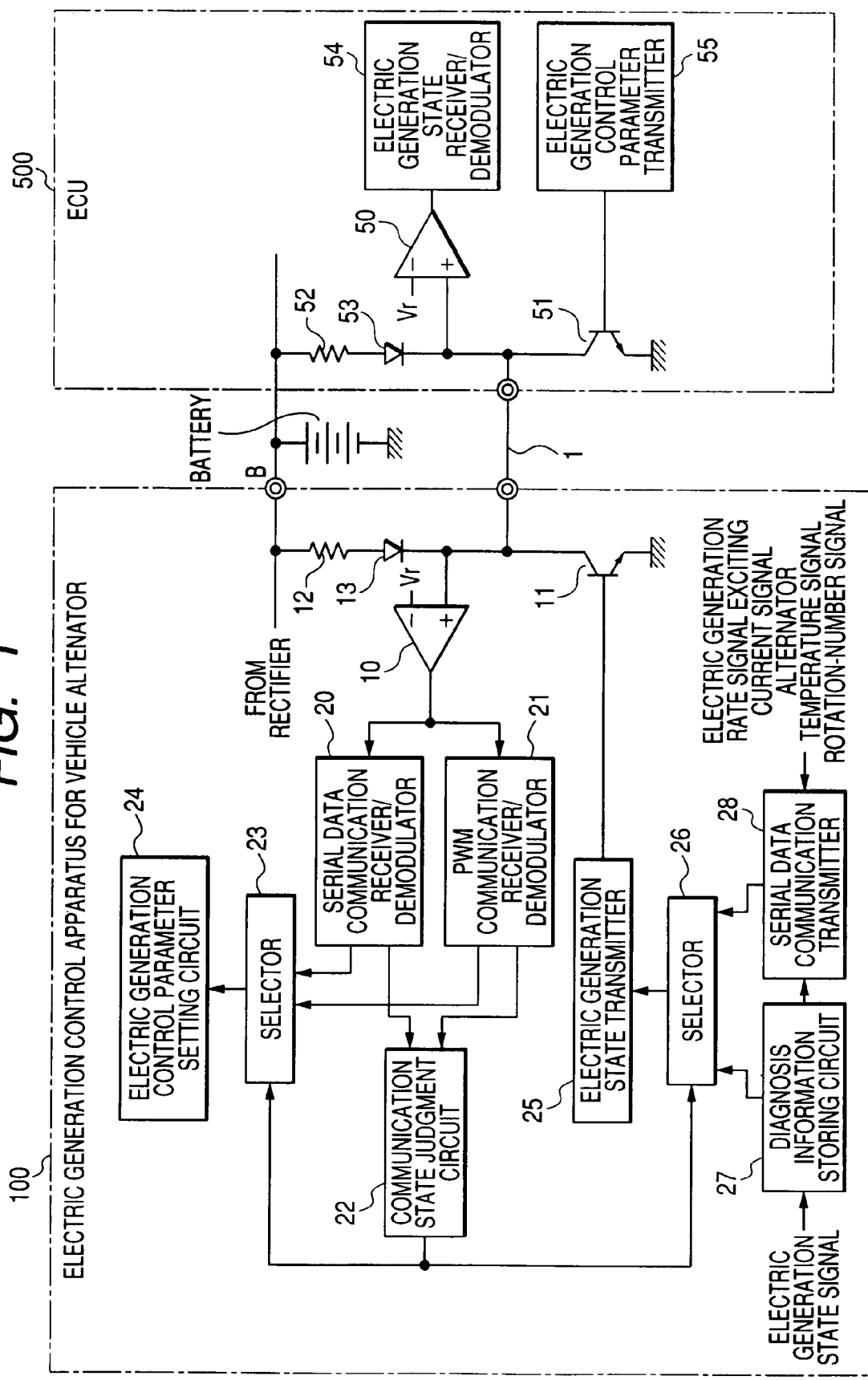
FIG. 1 is a diagram showing a partial configuration of an electric generation control apparatus for a vehicle alternator and an electronic control unit (ECU) according to an embodiment of the present invention.

Hereinafter, various embodiments of the present invention will be described with reference to the accompanying drawings. In the following description of the various embodiments, like reference characters or numerals designate like or equivalent component parts throughout the several diagrams.

Embodiment

A description will now be given of the electric generation control apparatus for an electric generator such as a vehicle alternator according to an embodiment, to which the concept of the present invention is applied, with reference to diagrams.

FIG. 1 is a diagram showing a partial configuration of the electric generation control apparatus for a vehicle alternator and an electronic control unit (ECU) according to the embodiment of the present invention.

Figure 10:
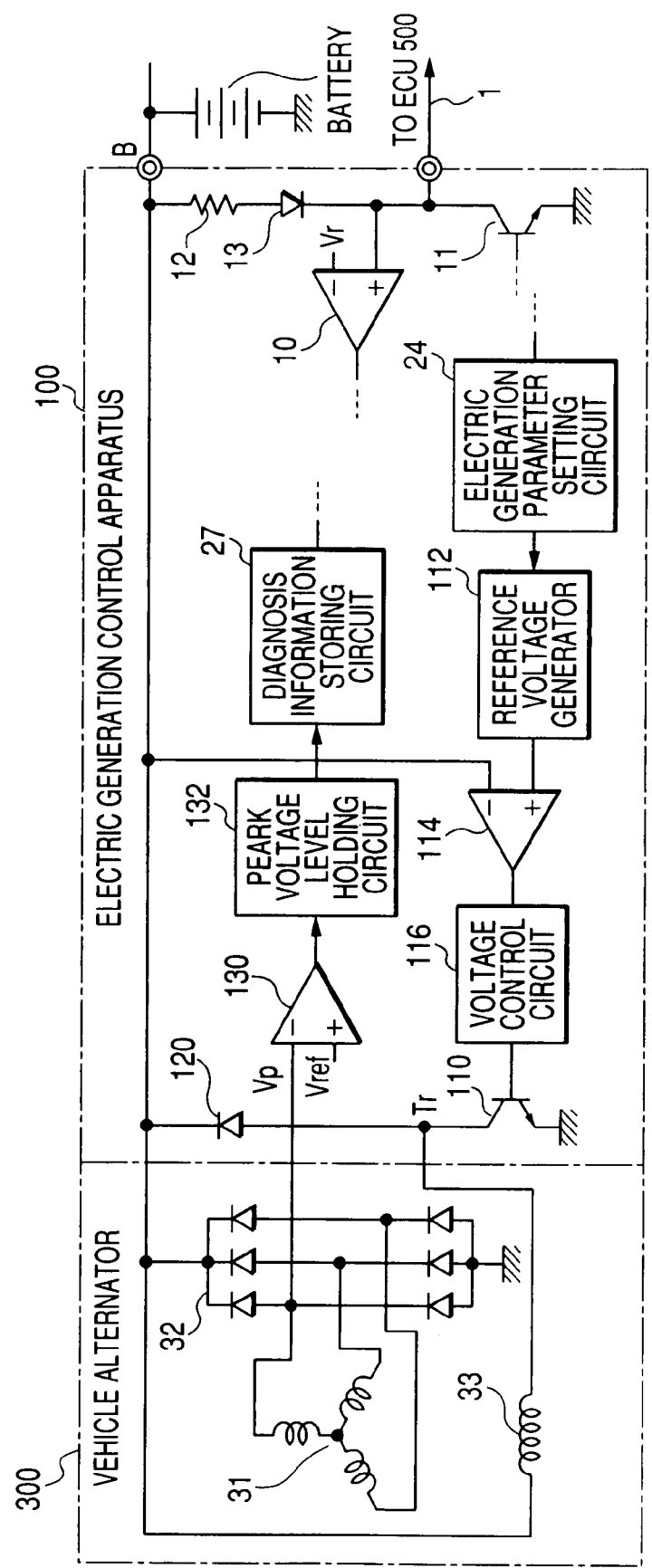
FIG. 10 is an entire configuration diagram of the vehicle alternator and the electric generation control apparatus for the vehicle alternator.

As shown in FIG. 1, the electric generation control apparatus 100 is electrically connected to the ECU 500 through a data transmission line 1. The electric generation control apparatus 100 is built in the vehicle alternator (for example, as shown in FIG. 10) or mounted on the outer peripheral portion of the vehicle alternator. The ECU 500 as an external control device is placed separately from the vehicle alternator in a vehicle.

The electric generation control apparatus 100 has a voltage comparator 10, a transistor 11, a resistance 12, a diode 13, a serial data communication receiver and modulator 20, a PWM (pulse width modulation) communication receiver and modulator 21, a communication state judgment circuit 22, selectors 23 and 26, an electric generation parameter setting circuit 24, an electric generation state transmitter 25, a diagnosis information storing circuit 27, and a serial data communication transmitter 28.

A communication interface circuit consists of the voltage comparator 10, the transistor 11, the resistance 12, and the diode 13. The voltage comparator 10 acts as a receiver circuit (or a receiving circuit) for receiving a control signal (as an electric generation control signal) transferred from the ECU 500 through the data transmission line 1.

Both the resistance 12 and the diode 13 are connected in series and form a pull-up circuit. The transistor 11 drives the pull-up circuit as a load in order to generate and transfer a control signal to the data transmission line 1. The pull-up circuit (made of the resistance 12 and the diode 13) and the transistor 11 form a driver circuit as a transmission circuit. During the halt of the data communication, the voltage potential of the data transmission line 1 is equal to the voltage potential of the battery by the pull-up circuit made of the resistance 12 and the diode 13.

During the data transmission in the data communication, when the transistor 11 as the drive circuit enters ON, the data transmission line 1 becomes a low level. The ON/OFF operation of the transistor 11 as the drive circuit generates data items of 0 (a low level) and 1 (a high level) for use in the serial data communication.

The serial data communication receiver and modulator 20 receives serial data in the serial data communication transferred from the ECU 500, and then demodulates electric generation control parameters in the serial data. The PWM communication receiver and modulator 21 receives a PWM signal as PWM data in the PWM communication transferred from the ECU 500, and then demodulates electric generation control parameters in the PWM signal.

The communication state judgment circuit 22 judges whether the data communication through the data transmission line 1 is the serial data communication or the PWM data communication. Based on the judgment result from the communication state judgment circuit 22, the selector 23 selects and then outputs the electric generation control parameters demodulated by the serial data communication receiver and modulator 20 or by the PWM communication receiver and modulator 21.

The electric generation control parameter setting circuit 24 receives the electric generation control parameters output from the selector 23, and then sets them to corresponding target circuits (omitted from the drawings).

The electric generation state transmitter 25 generates a serial data communication signal including electric generation parameters made of various types of signals and diagnosis information when the serial data communication is established. The various types of signals show the operation state of the vehicle alternator. The diagnosis information indicates the presence of abnormal operation of the vehicle alternator.

Further, the electric generation state transmitter 25 generates a PWM signal including the diagnosis information when the execution of the serial data communication is difficult, namely when the serial data communication is not established.

The diagnosis information storing circuit 27 stores the diagnosis information showing the occurrence of abnormal state of the electric generation of the vehicle alternator.

The serial data communication transmitter 28 generates an electric generation state parameter including various types of signals showing the operation state of the vehicle alternator. Those various types of signals are an electric generation rate signal, an exciting current signal, an electric generation temperature signal, a rotation number signal, an electric generation voltage signal, and the like.

The ECU 500 has a voltage comparator 50, a transistor 51, a resistance 52, a diode 53, an electric generation state receiver and demodulator 54, and an electric generation control parameter transmitter 55.

The voltage comparator 50 acts as a receiver configured to receive the communication signal transferred through the data transmission line 1 from the electric generation control apparatus 100.

The resistance 52 and the diode 53 are connected in series and form a pull-up circuit. The transistor 51 drives the pull-up circuit as an electric load in order to generate and transfer a control signal to the data transmission line 1. The pull-up circuit 52 and 53 and the transistor 51 form the driver circuit.

The electric generation state receiver and demodulator 54 receives the serial data communication signal or the PWM signal transferred from the electric generation control circuit 100, and demodulates the received signal to the electric generation state parameters.

The electric generation control parameter transmitter 55 generates a serial data communication signals including electric generation control parameters or a PWM signal including electric generation control parameters, and controls the ON/OFF operation of the transistor 51 in order to transfer the serial data communication signal or the PWM signal to the electric generation control apparatus 100 through the data transmission line 1.

The electric generation control parameter transmitter 55 transfers the electric generation control parameters in the serial data communication signal when the serial data communication is established or using a PWM signal when the serial data communication is not established.

Similarly to the judgment by the ECU 500, the electric generation control circuit 100 also judges whether the serial data transmission is established or not. The judgment manner will be explained later in detail.

The communication state judgment circuit 22 corresponds to the judgment circuit used in claims. The serial data communication receiver and modulator 20 and the PWM communication receiver and modulator 21 correspond to the demodulation circuit used in claims.

The PWM communication receiver and demodulator 21 has a time counter 212 for counting a low level, a period counter 213, and a division process duty arithmetic circuit 214 which correspond to the PWM demodulation circuit used in claims. The electric generation control circuit 100 and the ECU 500 according to the embodiment have the configuration described above.

A description will now be given of the control parameter transfer/receiving operation between the electric generation control circuit 100 and the ECU 500.

First, a data communication mode will be explained. During the data communication mode, the ECU 500 transfers the electric generation control parameters to the electric generation control circuit 100.

The ECU 500 generates a serial data communication signal including electric generation control parameters and transfers it to the electric generation control circuit 100 through the data transmission line 1. For example, the ECU 500 generates a data frame including a data field in which the electric generation control parameters are stored based on a LIN (Local Interconnect Network) protocol. The ECU 500 then transfers the serial data communication signal using the data frame to the electric generation control apparatus 100 through the data transmission line 1.

Figure 2:
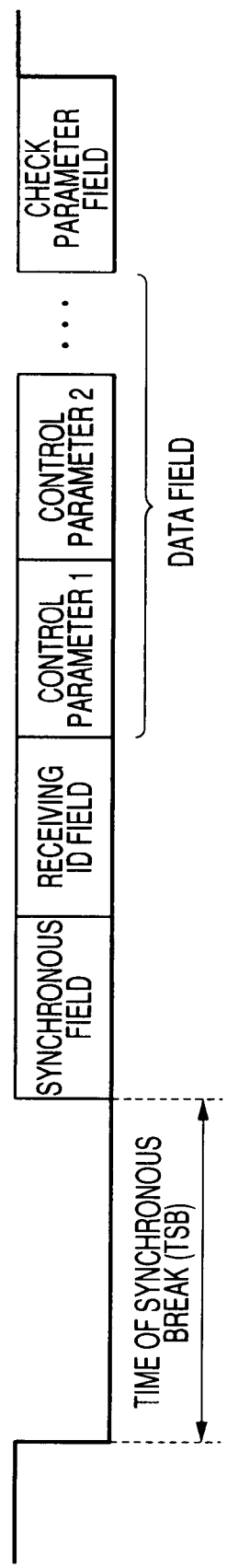
FIG. 2 shows a frame structure of a data frame to be transferred from the ECU to the electric generation control apparatus.

FIG. 2 is a diagram showing the frame structure of the data frame to be transferred from the ECU 500 to the electric generation control apparatus 100. As shown in FIG. 2, the data frame generated based on the LIN protocol has a synchronous field, an ID field (a receiving ID), a data field including a control parameter 1 and a control parameter 2, and a check parameter field.

A regulation voltage value for the vehicle alternator and an upper limit value of the driving duty ratio of an exciting current are set into the data field consisting the control parameter fields 1 and 2, for example.

When the ECU 500 initiates the data transmission for the serial data communication signal with the data frame based on the LIN protocol, the voltage comparator 10 as the receiver circuit in the electric generation control apparatus 100 receives serial data signals of high and levels corresponding to the serial data communication signal.

When receiving a synchronous break signal transferred from the ECU 500, the serial data communication receiver and modulator 20 judges the initiation of the serial data communication, and synchronizes with a clock signal used in the ECU 500 using data stored in the synchronous field involved in the serial data communication signal. After this, the serial data communication receiver and modulator 20 judges a receiving task for the electric generation control parameters based on data in the receiving ID field. Further, the serial data communication receiver and modulator 20 demodulates the electric generation control parameters stored in the data field by detecting bit values 0 and 1 therein.

When the serial data communication signal is established correctly as a result of the above judgment, the communication state judgment circuit 22 judges that the serial data communication is established correctly, and the selector 23 outputs the electric generation control parameters in the serial data communication signal received and demodulated to the electric generation control parameter setting circuit 24. When receiving the electric generation control parameters, the electric generation control parameter setting circuit 24 stores the received control parameters therein.

On the contrary, if the communication state judgment circuit 22 judges the difficulty to perform the serial data communication, namely, the serial data communication is not established, the selector 23 selects the electric generation control parameters obtained by the demodulation performed by the PWM communication receiver and modulator 21 based on the PWM communication processing.

Figure 3:
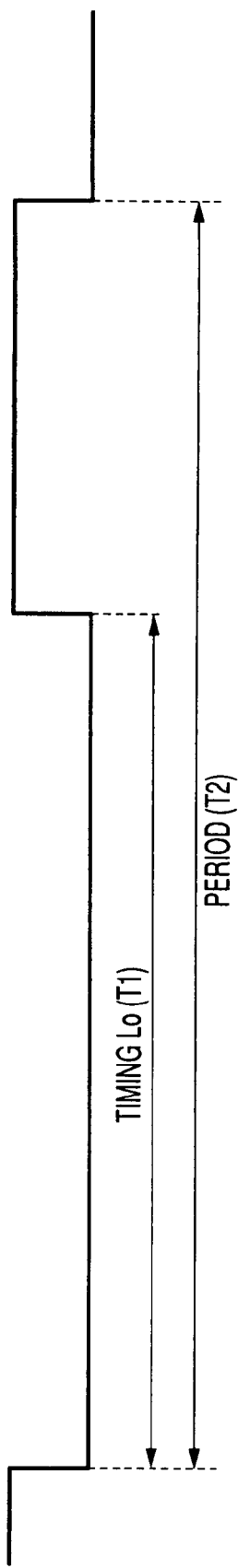
FIG. 3 shows a PWM communication processing performed by a PWM communication receiver and modulator.

FIG. 3 shows the PWM communication processing performed by the PWM communication receiver and modulator 21. As shown in FIG. 3, during the PWM communication, following two time periods are detected, the low level (Lo) timing T1 which indicates the timing period of a low level, and the period T2 which indicates the rising period of the data communication signal. The PWM communication receiver and demodulator 21 calculates the following equation using a duty ratio "D" of the PWM signal and the frequency "f" in order to generate the electric generation control parameters:

$D = T1/T2$, and $f = 1/T2$.

Because the PWM communication uses only two kinds of the control parameters such as the frequency f (or the period T2) and the duty ratio D, a default value (or a standard value) is set in advance to other control parameters other than the above two electric generation control parameters.

Next, a description will now be given of the transmission mode for the electric generation state parameters from the electric generation control apparatus 100 to the ECU 500.

Figure 4:
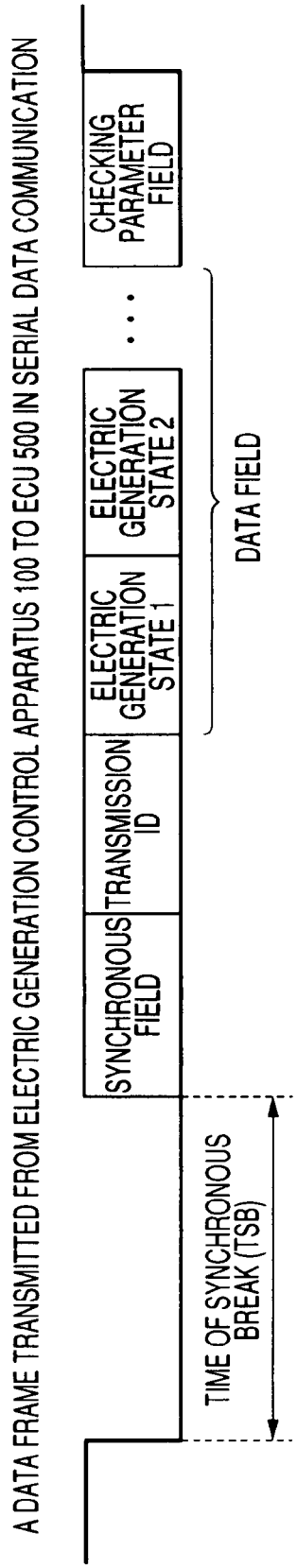
FIG. 4 shows a structure of a data frame to be transferred from the electric generation control apparatus to the ECU.

FIG. 4 is a diagram showing a structure of the data frame to be transferred from the electric generation control apparatus 100 to the ECU 500.

Similar to the transmission of the electric generation control parameters from the ECU 500 to the electric generation control apparatus 100, when receiving a synchronous break signal transferred from the ECU 500, the electric generation state transmitter 25 in the electric generation control apparatus 100 judges the initiation of the serial data communication, and synchronizes with the clock signal in the ECU 500 using data stored in the synchronous field involved in the serial data communication signal. After this, the electric generation state transmitter 25 judges a transmission task for the electric generation state parameters based on data in the transmission ID field. Further, the electric generation state transmitter 25 assigns the electric generation state parameters to the data field and transfers the serial data communication signal to the ECU 500 through the data transmission line 1 by performing the ON/OFF operation of the transistor 11.

As a concrete example, when the diagnosis information storing circuit 27 stores the diagnosis information as the judgment result of the presence of the abnormal state of the electric generation operation of the vehicle alternator, the serial data communication transmitter 28 sets to the serial data communication signal the electric generation state parameters such as an electric generation rate signal, an exciting current signal, an alternator temperature signal, and a rotation number signal designated by a bit stream made of 0 and 1 values. When the communication state judgment circuit 22 judges that the serial data communication is established, the transistor 11 performs the ON/OFF operation according to the value of the bit stream as the electric generation state parameters that have been set by the serial data communication transmitter 28, so that the serial data communication signal including the electric generation state parameters is transferred to the ECU 500 through the data transmission line 1.

On the contrary, if the communication state judgment circuit 22 judges the difficulty to perform the serial data communication, namely the serial data communication is not established, the selector 26 selects the diagnosis information stored in the diagnosis information storing circuit 27. The electric generation state transmitter 25 performs the ON/OFF operation of the transistor 11 according to the diagnosis information. Therefore even if the judgment result indicates that serial data communication is not established, when the vehicle alternator falls into abnormal state, the electric generation state transmitter 25 indicates that the transistor 11 enters ON in order to fix the data transmission line 1 to a specified voltage potential, as a result, the electric generation state transmitter 25 transfers the diagnosis information to the ECU 500 through the data transmission line 1.

Figure 5:
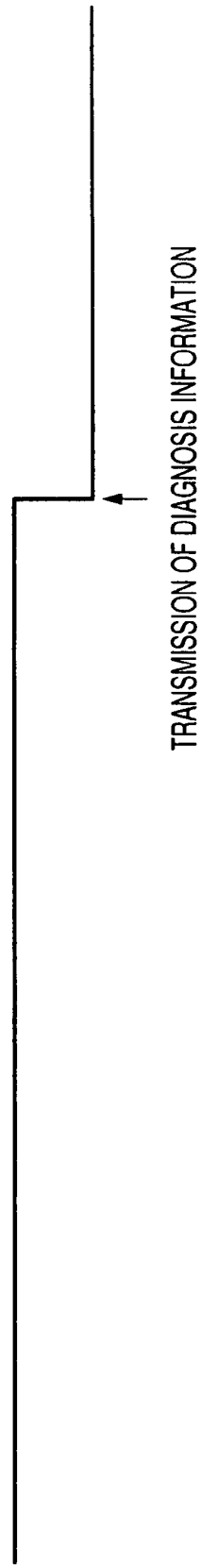
FIG. 5 shows a timing to transfer diagnosis information when a serial data communication is not established.

FIG. 5 shows a timing to transfer the diagnosis information when the serial data communication is not established. For example, if the vehicle alternator falls into the abnormal state such as the stop of the electric generation, the electric generation state transmitter 25 enters the transistor 11 to the OFF state, and the low level signal as the diagnosis information is thereby transferred to the ECU 500 through the data transmission line 1.

Next, a description will now be given of the concrete operation of the data communication judgment state.

For example, the data communication state is judged using the output from the filter 211 in the PWM communication receiver and demodulator 21.

Figure 6:
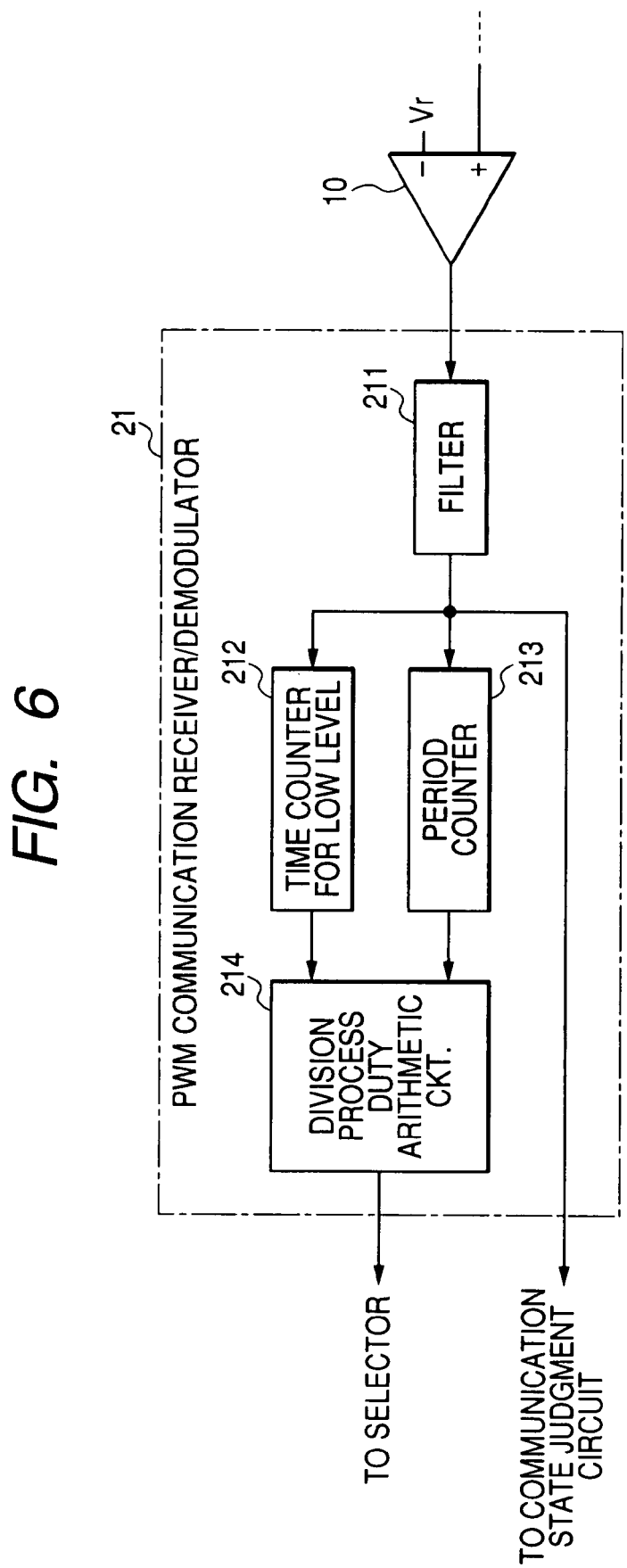
FIG. 6 shows a detailed circuit configuration of the PWM communication receiver and modulator.

FIG. 6 shows a detailed circuit configuration of the PWM communication receiver and modulator 21. FIG. 7A shows an output signal of the voltage comparator 10 in the serial data communication. FIG. 7B shows an output signal of the filter 211 during the serial data communication. FIG. 7C shows an output signal of the voltage comparator 10 in the PWM communication. FIG. 7D shows an output signal of the filter 211 in the PWM communication.

As shown in FIG. 6, the PWM communication receiver and modulator 21 has the filter 211, the time counter 212 for a low level, the period counter 213, and the division process duty arithmetic circuit 214.

The filter 211 is a low pass filter. The filter constant of the filter 211 is longer in time than the synchronous break time TSB that indicates the initiation of the digital communication.

In the serial data communication according to the embodiment, it is so set that a maximum bit length is shorter in time than the synchronous break time TBS (see FIG. 7A), the entire length of a bit string in the serial data communication cannot pass through the filter 211 (see FIG. 7B). The communication state judgment circuit 22 monitors the output signal from the filter 211, and judges that the communication signal transferred from the ECU 500 is the communication data in the serial data communication if the voltage level of the output signal from the filter 211 is not changed.

On the contrary, as shown in FIG. 7C and FIG. 7D, if the voltage level of the output signal from the filter 211 is changed, the period counter 213 counts the period of the output signal from the filter 211, and further the time counter 212 counts the time length of a low level. Finally, the division process duty arithmetic circuit 214 performs the division process (the time length of a low level/a period) in order to demodulate the PWM signal transferred from the ECU 500 correctly.

Next, a description will now be given of a concrete example of the judgment of the serial data communication.

Figure 8:
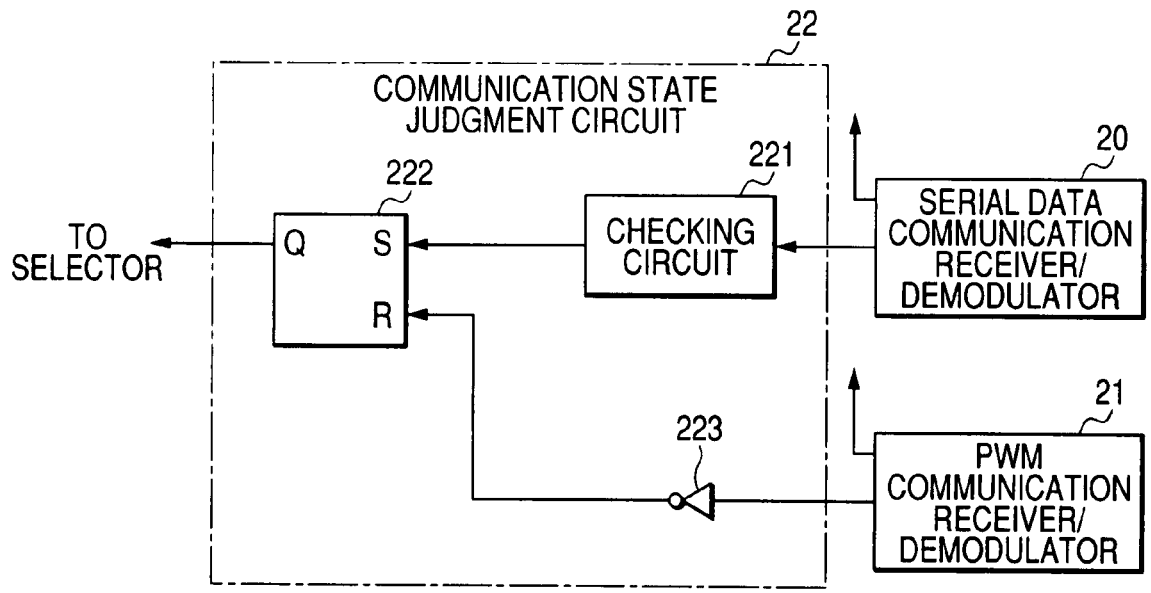
FIG. 8 is a detailed circuit diagram of a communication state judgment circuit.

FIG. 8 is a detailed circuit diagram of the communication state judgment circuit 22. As shown in FIG. 8, the communication state judgment circuit 22 has a checking circuit 221, a SR flip flop (SR-FF) 222, and an inverter 223.

When receiving the serial data communication signal, the checking circuit 221 checks whether or not it involves an error bit based on a parity bit or a checksum bit. If there is no error bit as a result of the checking, namely when the serial data communication signal is a normal bit stream, the checking circuit 221 outputs a high level signal to the SR flip flop 222. Thereby, the SR flip flop 222 outputs a high level signal indicating that the serial data communication is established correctly.

On the contrary, when the electric generation control apparatus 100 receives the PWM data communication signal, because the output of the filter 211 in the PWM data communication receiver and modulator 21 is inverted, the SR flip flop 222 is thereby reset. This indicates the difficulty to perform the serial data communication, namely, the serial data communication is not established.

Figure 9:
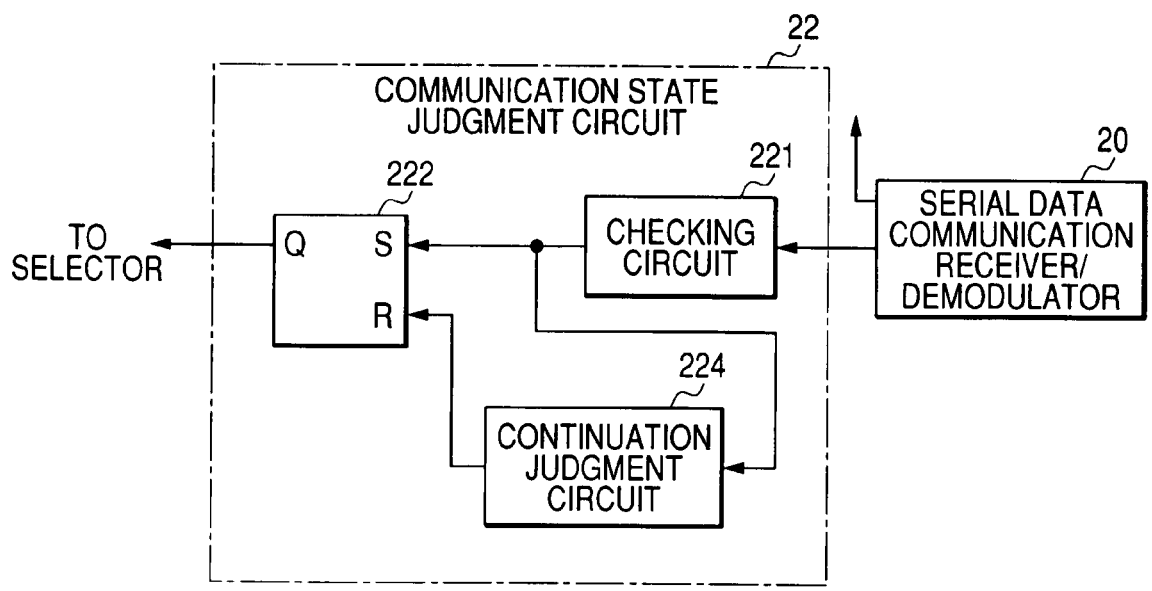
FIG. 9 is a diagram showing a modified configuration of the communication state judgment circuit.

FIG. 9 is a diagram showing a modified configuration of the communication state judgment circuit 22.

The communication state judgment circuit 22 shown in FIG. 9 has a continuation judgment circuit 224 instead of the inverter 223 shown in FIG. 8. The continuation judgment circuit 224 inputs the result of the checking operation by the checking circuit 221, and judges a continuous time period or stores the accumulated number of occurrences of the abnormal state of the serial data communication. If judging that the accumulated number of the occurrences of the abnormal state is more than a specified time length or a specified number, the continuation judgment circuit 224 resets the R terminal of the SR flip-flop 222. It is thereby judged that the serial data communication has already been established. If the normal serial data communication is established correctly, the continuation judgment circuit 224 sets the S terminal of the SR flip-flop 222.

Next, a description will now be given of a concrete example of the entire configuration of the electric generation control apparatus 100 and the vehicle alternator with reference to FIG. 10.

FIG. 10 shows the entire configuration of the vehicle alternator 300 and the electric generation control apparatus 100.

The vehicle alternator 300 has three phase stator windings 31 wound on a stator, a rectifier circuit 32 that performs a full-wave rectifying of a three phase output from the stator coils 31, and exciting winding 33 wound on a rotor. The electric generation control apparatus 100 adjusts the ON/OFF operation of the current flowing to the exciting winding 33 in order to control the electric generation of the vehicle alternator 300.

The electric generation control apparatus 100 for the vehicle alternator 300 is equipped with an exciting current drive transistor 110, a reference voltage generation circuit 112, a voltage comparators 114 and 130, a voltage control circuit 116, a reflux diode 120, and a peak hold circuit 132. The electric generation control apparatus 100 further has the components shown in FIG. 1. That is, FIG. 10 shows a part of the configuration of the electric generation control apparatus 100. The components shown in FIG. 1 are omitted from FIG. 10 for brevity.

The exciting current drive transistor 110 connected to the exciting winding 33 in series is a switching element performing the ON/OFF operation of the current flowing through the exciting winding 33

The emitter of the exciting current drive transistor 110 is earthed or ground, the collector thereof is connected to the B terminal (or the Battery terminal) through the reflux diode 120. The reflux diode 120 is electrically connected to the exciting winding 33 in parallel in order to perform the reflux of the exciting current when the exciting current drive transistor 110 is OFF.

The electric generation control parameter setting circuit 24 sets electric generation control parameters based on the received signal transferred from the ECU 500. The electric generation control parameters include a reference voltage parameter as a regulating voltage for the vehicle alternator 300. The reference voltage generator 112 generates the reference voltage based on the reference voltage parameter and supplies the generated reference voltage to a plus (or positive) input terminal of the voltage comparator 114.

The voltage comparator 114 compares the output voltage at a minus (or negative) input terminal supplied from the vehicle alternator 300 with the reference voltage at the plus input terminal. The voltage comparator 114 outputs a high level signal to the voltage control circuit 116 when the output voltage of the vehicle alternator is lower than the reference voltage, and the voltage comparator 114 outputs a low level signal to the voltage control circuit 116 when the output voltage of the vehicle alternator is higher than the reference voltage.

The voltage control circuit 116 drives the exciting current drive transistor 110 based on the output of the voltage comparator 114 in order to perform the PWM control of the exciting current flowing through the exciting winding 33.

Further, the voltage comparator 130 monitors the one phase voltage of the stator windings 31 of the vehicle alternator 300, and the peak voltage level holding circuit 132 holds the peak voltage of the one phase voltage of the stator windings 31. Thus, the peak voltage level holding circuit 132 stores the electric generation state signal as the diagnosis information indicating whether or not the electric generation of the vehicle alternator 300 is carried out or halted. The diagnosis information stored in the peak voltage level holding circuit 132 is transferred to the ECU 500 through the data transmission line 1.

As described above in detail, the electric generation control apparatus 100 for the vehicle alternator 300 is capable of performing the data communication using both the serial data communication and the PWM communication. The serial data communication can transfer a large amount of data information. The PWM communication uses PWM signals that are strongly resistant to noises. Accordingly, even if noises are on the data transmission line 1, the electric generation control apparatus 100 can receive the electric generation control parameters, transferred from the ECU 500, by using the PWM signals. It is thereby possible to control the electric generation of the vehicle alternator 300 certainly while keeping at least a basic communication capability satisfying basic requirement for the data communication between the electric generation control apparatus 100 and the ECU 500.

In addition, according to the present invention, it is possible to judge whether the received signal is a serial data signal or a PWM signal certainly by monitoring and checking a received data signal having a fixed level that is or not longer than the maximum allowable time length for the serial data signal. In particular, it is possible to select an optimum filter constant having an adequate time margin to noises by incorporating the filter 211 having a long filter constant than the fixed time length corresponding to the synchronous break signal. It is thereby possible to prevent any change of the data signal against noises, and to eliminate the serial data communication and to perform the PWM communication certainly.

Further, according to the present invention, the electric generation control signals are transferred using a serial data signal in the serial data communication from the ECU 500 to the electric generation control apparatus 100 when the serial data communication can be established, and on the contrary, using the PWM signal in the PWM communication when the serial data communication is hardly carried out.

Thereby, on judging the difficulty to perform the serial data communication, for example, such as a case in which the predetermined control process of the electric generation of the vehicle alternator cannot be performed using the serial data communication, such as a case in which the serial data communication cannot be established on monitoring the signal level of the data transmission line 1, and such as a case in which there is no response to the electric generation control signal, the ECU 500 can switch the serial data communication to the PWM communication. It is therefore possible for the ECU 500 and the electric generation control apparatus 100 to perform at least a basic communication for the electric generation control.

Still further, according to the present invention, the electric generation control apparatus 100 fixes the voltage potential of the data transmission line 1 at a specified voltage level in order to inform to the ECU 500 the occurrence of abnormal state of the vehicle alternator 300 when the serial data transmission cannot be performed. Accordingly, even if the electric generation control apparatus 100 cannot perform the serial data communication and thereby difficult to transfer the electric generation state of the vehicle alternator 300 to the ECU 500 using the serial data communication, the electric generation control apparatus 100 can inform the abnormal state of the electric generation of the vehicle alternator 300 to the ECU 500 using the PWM communication. That is, the electric generation control apparatus 100 can inform the minimum information regarding the abnormal state of the electric generation of the vehicle alternator 300 to the ECU 500. In particular, when the abnormal state of the serial data communication is continued for a specified time length, or when the number of the occurrences of the abnormal state exceeds a specified number, the electric generation control apparatus 100 judges the difficulty to perform the serial data communication certainly. Further, it is possible for the electric generation control apparatus 100 to continue the serial data communication even if random failure in the serial data communication occurs by checking whether the time length of the abnormal state is longer than a specified time length or the number of the occurrences of the abnormal state exceeds a specified number.

The concept of the present invention is not limited by the above embodiments and the modifications. It is possible to modify the configurations described above within the scope of the present invention. Although the above embodiment has shown the electric generation control using the reference voltage, namely the regulating voltage as one of the electric generation control parameters, for example, it is possible to control the electric generation by using the upper limit value of the exciting current drive duty ratio, the upper limit value of the exciting current, or other electric generation control parameters.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. An electric generation control apparatus for a vehicle alternator comprising:

an electric generation state transmitter configured to generate a serial data signal including an electric generation state signal indicating a state of the vehicle alternator, and to transfer the serial data signal through a data transmission line to an external control device located apart from the electric generation control apparatus;

a communication state judgment circuit configured to judge a communication state through the data transmission line; and a diagnosis information setting circuit configured to instruct to the electric generation state transmitter so that the voltage of the data transmission line is fixed to a specified level in order to inform occurrence of abnormal state of the electric generation of the vehicle alternator to the external control device when the communication state judgment circuit judges difficulty of serial data transmission using the serial data signal.

2. The electric generation control apparatus according to claim 1, wherein the communication state judgment circuit judges the difficulty of the serial data transmission using the serial data signal when one of following conditions occurs:
   (a) the abnormal state of the serial data communication is continued for a specified time length; and
   (b) the number of the abnormal states of the electric generation of the vehicle alternator exceeds a specified number.

* * * * *

UNITED STATES PATENT AND TRADEMARK OFFICE
CERTIFICATE OF CORRECTION

PATENT NO.         : 7,285,937 B2
APPLICATION NO. : 11/785208
DATED              : October 23, 2007
INVENTOR(S)        : Tadatoshi Asada It is certified that error appears in the above-identified patent and that said Letters Patent is hereby corrected as shown below:

The following should be added to the title page:
--[30] Foreign Application Priority Data
Aug. 3, 2005   (JP) ……………………. 2005-225447--

Signed and Sealed this

Eighteenth Day of March, 2008

JON W. DUDAS
*Director of the United States Patent and Trademark Office*